United States Patent [19]
Schoos et al.

[11] Patent Number: 5,851,026
[45] Date of Patent: *Dec. 22, 1998

[54] METHOD AND INSTALLATION FOR DETECTING CERTAIN PARAMETERS CONCERNING AN AUXILIARY CHILD SEAT WITH A VIEW TO CONTROLLING THE OPERATION OF THE AIRBAGS OF A VEHICLE

[75] Inventors: Aloyse Schoos; Michel Witte, both of Bertrange, Luxembourg

[73] Assignee: I.E.E. International Electronics & Engineering, Treves, Luxembourg

[ * ] Notice: The term of this patent shall not extend beyond the expiration date of Pat. No. 5,618,056.

[21] Appl. No.: 829,702

[22] Filed: Mar. 26, 1997

Related U.S. Application Data

[63] Continuation-in-part of Ser. No. 543,631, Oct. 16, 1995, Pat. No. 5,618,056.

[30] Foreign Application Priority Data

Oct. 17, 1994 [LU] Luxembourg ............................. 88547
Feb. 15, 1995 [LU] Luxembourg ............................. 88588

[51] Int. Cl.⁶ ............................. B60R 21/22; B60R 21/32
[52] U.S. Cl. ......................... 280/735; 280/732; 340/572; 297/250.1
[58] Field of Search ................................... 280/735, 734, 280/732, 730.1, 728.1; 180/273, 272; 340/572, 667, 666; 297/250.1, 216.11

[56] References Cited

U.S. PATENT DOCUMENTS 3,810,147  5/1974  Lichtblau ............................. 340/572
5,103,209  4/1992  Lizzi et al. ............................. 340/572
5,515,933  5/1996  Meyer et al. ............................. 280/735
5,605,348  2/1997  Blackburn et al. ....................... 280/735

OTHER PUBLICATIONS

Research Disclosure No. 35519, "Infant Seat Detection System", disclosed anonymously. Nov. 1993.

Research Disclosure No. 35804, "Passenger Side Air Bag Deployment Inhibit", disclosed anonymously. Feb. 1994.

Research Disclosure No. 35909, "Passive RF Technique for Disabling Passenger Side Airbag When Used With a Rearward Facing Infant Seat", disclosed by Jon P. Kelley. Mar 1994.

Primary Examiner—Peter C. English
Attorney, Agent, or Firm—Leydig, Voit & Mayer, Ltd.

[57] ABSTRACT

A system to detect certain parameters concerning an auxiliary child seat placed on a passenger seat of a motor vehicle equipped with an airbag protection system. The system uses inductive electromagnetic emitter, inductive electromagnetic receiver, and resonant circuits to detect various parameters concerning the child seat. Some of the parameters include the presence of a child seat, the orientation of the child seat, and the type of child seat present. These parameters are transmitted to an airbag control unit for adapting the deployment of the airbag to the specific circumstances as indicated by the inductive and resonant circuits. The transmitted information allows the airbag control unit to disable the airbag in certain situations where it is not needed.

63 Claims, 6 Drawing Sheets

METHOD AND INSTALLATION FOR DETECTING CERTAIN PARAMETERS CONCERNING AN AUXILIARY CHILD SEAT WITH A VIEW TO CONTROLLING THE OPERATION OF THE AIRBAGS OF A VEHICLE

CROSS-REFERENCE TO A RELATED APPLICATION

This application is a continuation-in-part of U.S. patent application Ser. No. 08/543,631, filed Oct. 16, 1995, U.S. Pat. No. 5,618,056 to Schoos et al., entitled "Method and installation for detecting certain parameters concerning an auxiliary child seat with a view to controlling the operation of the airbags of a vehicle."

FIELD OF THE INVENTION

The present invention relates to a method for detecting certain parameters concerning an auxiliary child seat placed on a passenger seat of a motor vehicle equipped with an airbag protection system, it being possible for these parameters to be used to adapt the deployment of the airbag or airbags associated with the seat supporting the said auxiliary seat to specific circumstances determined by these parameters. The invention also relates to an installation for the implementation of this method.

BACKGROUND OF THE INVENTION

The ever-increasing amount of airbag equipment in vehicles has allowed a great deal of information to be gathered concerning the operation of airbags, something which has greatly contributed to improving them. One of these improvements consists in subjecting the operation of the airbag to an intelligent control unit which may be fed by various detectors in order to adapt the deployment of the airbag to certain circumstances. Thus, for example, document DE-4237072 proposes a system for detecting whether or not the passenger seat is occupied, so as to disable this airbag when said passenger seat is not occupied, in order not to have to replace the airbag when the vehicle is repairable after an impact which has triggered the deployment of the airbag.

Furthermore, novel gas generators are currently under development so as to make it possible, in the future, to have a multi-level operation and a deployment which is modulated and more graduated than all-or-nothing, especially so as to take account of the inertial mass of the passenger, which may be obtained through the information supplied by the seat-occupancy detector, when the latter consists of a pressure sensor of the FSR type.

Moreover, equipping each seat of a vehicle with several individual airbags, the deployments of which are different and adapted to zones to be protected is known. Although the merit of airbags has meanwhile been recognized in the interest of passenger safety, there are situations in which the deployment of an airbag may be harmful or even constitute serious danger. There are currently on the market many types of auxiliary child or infant seats which are designed to be installed on the front passenger seat. Of these seats, some are designed to point in the direction of travel of the vehicle, and others in the opposite direction with the back against the glovebox area or the dashboard and some may be installed either way round as desired. Now, for most seats which point in the opposite direction to the direction of travel of the vehicle, there is the risk that the deployment of the airbag will throw the child together with the seat violently towards the rear of the vehicle and will be the cause of serious injury. In such a case, and for the seats in question, it would therefore be useful to be able to disable the airbag.

It has even been observed that some child seats which point in the direction of travel may also be dangerous in the event of the deployment of the airbag, so that some manufacturers recommend that an airbag be disabled whenever the seat with which it is associated is occupied by an auxiliary child seat. Moreover, sometimes the child seat remains in place on the seat of the vehicle without actually being occupied. In this case, there is also something to be said for avoiding the deployment of the airbag since, as mentioned earlier, the replacement of an airbag gives rise to quite substantial expenditure.

OBJECTS AND SUMMARY OF THE INVENTION

The object of the present invention is to provide a method and an installation which make it possible to detect reliably various parameters concerning an auxiliary seat in order, in certain circumstances, to disable the airbag system directly or, and for preference, to transmit signals to an intelligent airbag-control unit which is programmed to control the airbag or adapt its deployment to the circumstances.

In order to achieve this objective, the method according to the invention comprises the steps of detecting by electromagnetic means the presence of the said auxiliary seat irrespective of its orientation and, whenever a child seat is detected, detecting its orientation.

According to the present invention, not only the presence of the child seat is detected irrespective of its orientation, but in a second step also the orientation and preferably the occupancy of the auxiliary seat are detected, which makes it possible to disable an airbag when the auxiliary seat is unoccupied or when it points in the opposite direction to the direction of travel, and to leave it enabled or modulate the intensity of its deployment when the auxiliary seat is pointing in the direction of travel.

This detection of the position may also be used to inform the driver of incorrect positioning, independently of the orientation.

According to another embodiment, the type of auxiliary seat and/or its identification code are furthermore detected, which makes it possible further to diversify the control of an airbag or the modulation of the deployment to take account of the fact that some seats are safer than others or may be equipped with a special protective device.

The invention also envisages an installation of the implementation of this method comprising at least one electromagnetic induction emitter circuit and at least one electromagnetic induction receiver circuit, each electromagnetic induction emitter and receiver circuit being incorporated into the passenger seat of the vehicle which is protected by the airbag protection system; at least one resonant circuit incorporated into the base of the said child seat and positioned, when the child seat is placed on the passenger seat, to influence an electromagnetic coupling between each electromagnetic induction emitter and receiver so as to cause each electromagnetic induction receiver circuit to deliver a signal representing at least one of the parameters. Thereby the system comprises either at least two electromagnetic induction emitter circuits or at least two electromagnetic induction receiver circuits or at least two resonant circuits, the arrangement of the at least one electromagnetic induction emitter and receiver circuits in the passenger seat and the arrangement of the at least one resonant circuit in the child seat being in such a way that the presence of the child seat is detectable irrespective of its orientation and that whenever a child seat is present, its orientation is detectable.

In other words, in order to safely detect the position of a child seat regardless of its orientation and to determine its orientation whenever a seat is present, the system can comprise any of the following combinations: 1. at least one emitter, at least one receiver and at least two resonant circuits; 2. at least one emitter, at least two receivers and at least one resonant circuit; 3. at least two emitters, at least one receiver and at least one resonant circuit. It should be noted, that such a system leads to an increased reliability in detecting the different parameters of a child seat. In fact, the prior art devices comprising one emitter, one receiver and one resonant circuit could either only detect the presence of a child seat irrespective of its orientation, or detect the presence of a child seat only in a predetermined orientation. In the first case, no determination of the orientation is possible, in the latter case, the presence of the child seat can not be detected when installed in a different orientation.

The installation may include at least one emitter coil fed with alternating current by an oscillator and at least one receiver coil, the emitter and receiver coils being incorporated into the passenger seat.

The emitter and receiver coils may be flat coils printed on a flexible support sheet.

The resonant circuit incorporated into the child seat may be a flat coil associated with an electronic circuit intended to modulate the electromagnetic coupling with a characteristic code or item of information.

The child seat preferably includes two resonant circuits, the associated circuits of which produce different modulations with a view to distinguishing between them and, consequently, to detecting the orientation of the child seat with improved reliability.

Instead of directly controlling the disabling of an airbag on the basis of the data picked up, it is preferable to transmit the data relating to various parameters of the child seat to an intelligent control unit to which airbag equipment is increasingly subjected. This unit then exerts control over the operation of the airbag on the basis of the information received.

The emitter and receiver circuits may thus each consist of at least one elongate inductive structure extending over one lateral side of the seat, while the resonant circuits include inductive coils situated laterally along both sides in the base of the child seat, the inductive structures in the seat and the coils in the child seat having superficial dimensions which are greater than or comparable with the vertical distance between the said structures and the said coils.

The passenger seat contains, preferably on each side, a pair of emitter and receiver structures. Given that these two inductive structures are found on the sides of the passenger seat, that is to say in regions which are subjected to less deformation than the central region of the seat, the detection system is hardly disrupted by the deformations of the seat.

Given that the superficial dimensions of the inductive structures and of the resonant circuit are relatively large, it is possible to facilitate the electromagnetic coupling and the geometric association and reduce the sensitivity to small displacements of the child seat.

The pairs of emitter and receiver structures are preferably combined on a flexible thin film incorporated into the seat, so that the passenger is not put to any discomfort.

The electromagnetic coupling may be modulated by switching the resonant frequency of the circuit incorporated into the child seat. Such a modulation consumes practically no energy.

Since the modulation and the information transmitted are in a known temporal relationship with the excitation generator, it is possible, so as to improve the signal/noise ratio, to use synchronous detection methods. The modulation of the electromagnetic coupling by a synchronous subcarrier frequency serves to render the interpretation of the signal more unique and more reliable. It will be noted that the synchronous subcarrier frequency can advantageously be provided by a frequency divider comprised in the electronic modulation circuit means and acting directly or via a second oscillator on a capacitor of the resonant circuit.

To reduce the influence of the tolerance of the electronic components and eliminate phase-cancellation phenomena, the excitation frequency may be varied periodically within a band of predetermined frequencies.

Demodulation may be synchronized with the excitation signal and reception may use methods of coincidence with the signal emitted.

The child seat advantageously contains a system for recognizing whether this seat is occupied. Such systems are known per se and are already commonly used to detect whether or not a passenger seat is occupied. In this case, the information transmitted by the modulation of the electromagnetic coupling of the resonant circuit is modified by the child seat occupancy sensor in order to transmit the information relating to the occupancy of the seat to the airbag control unit. This information serves to prevent the deployment of an airbag when the child seat is not occupied, irrespective of its orientation.

To transmit the information relating to the presence, the orientation, the type and, possibly, the occupancy of the child seat, it is possible to modulate the inductive coupling using a pseudo-random binary sequence imposed on the resonant circuit in the child seat by an electronic circuit.

The invention further relates to an auxiliary child seat for installing on a passenger seat of a motor vehicle, said child seat comprising at least two resonant circuits incorporated therein and arranged for cooperating with at least one electromagnetic induction emitter circuit and at least one electromagnetic induction receiver circuit incorporated into the passenger seat of the vehicle in order to determine certain parameters concerning said auxiliary child seat.

In a preferred embodiment, the resonant circuits comprise means for influencing an electromagnetic coupling between each electromagnetic induction emitter and receiver circuit so as to cause each electromagnetic induction receiver circuit to deliver a signal representing at least one of the parameters.

Each of the resonant circuits is preferably associated with electronic modulation circuit means for modulating the electromagnetic coupling with a distinct modulation, the distinct modulation of each resonant circuit providing means for distinguishing between the respective resonant circuits.

Each resonant circuit has preferably a resonant frequency and includes means for switching the resonant frequency of each resonant circuit, the switching of the resonant frequency thereby modulating the electromagnetic coupling.

In a preferred embodiment, each resonant circuit in the child seat modulates the resonant frequency with a subcarrier frequency synchronous with the exciting frequency of the electromagnetic induction emitter circuit in the passenger seat of the vehicle, wherein each resonant circuit has advantageously a distinct subcarrier frequency. It will be noted that the synchronous subcarrier frequency can be provided by a frequency divider comprised in the electronic modulation circuit means and acting directly or via a second oscillator circuit on the means for switching said resonant frequency, e.g. a variable capacitor of the resonant circuit.

Furthermore it is preferable to provide means for modulating the inductive coupling of the resonant circuits using a pseudo-random binary sequence imposed on the resonant circuits.

The invention relates further to a resonant circuit for using in a system or child seat as described above. This resonant circuit comprises means for influencing the electromagnetic coupling between at least one electromagnetic induction emitter circuit and at least one electromagnetic induction receiver circuit incorporated into the passenger seat of the vehicle, whereby it is preferably associated with electronic modulation circuit means for modulating the electromagnetic coupling with a characteristic modulation.

These and other objects and advantages of the invention will become more apparent from the following detailed description when taken in conjunction with the accompanying drawings.

BRIEF DESCRIPTION OF THE DRAWINGS

Other specific features and characteristics of the invention will emerge from the description of a few preferred embodiments given below by way of illustration with reference to the appended drawings in which.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
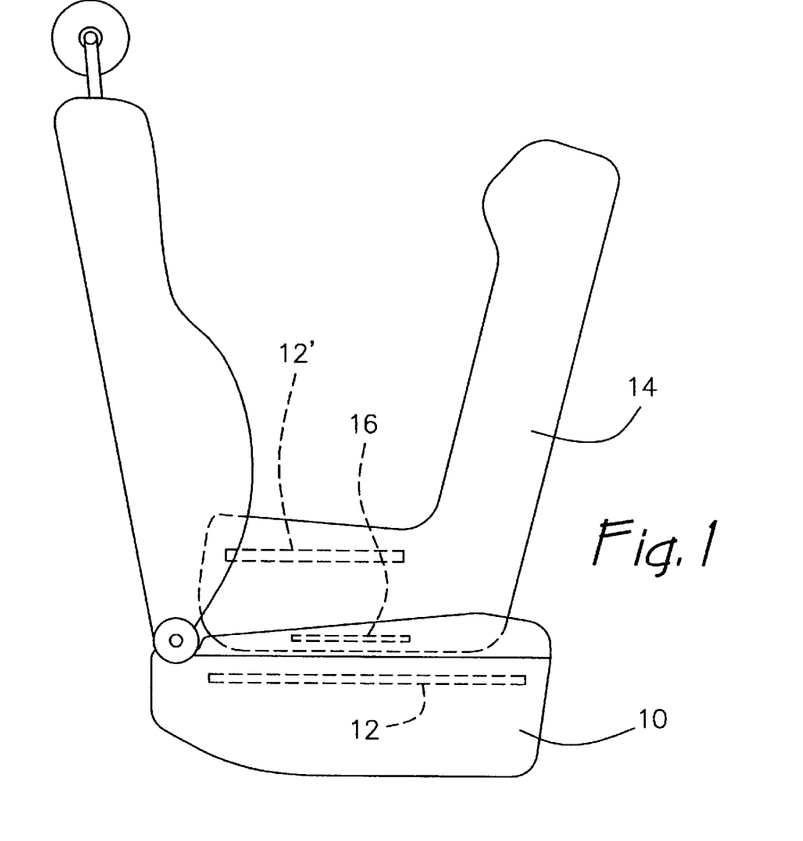
FIG. 1 represents a lateral diagrammatic view of the child seat placed on the passenger seat.

Reference 10 in FIG. 1 diagrammatically illustrates the front passenger seat of a motor vehicle. This seat is equipped with a pressure sensor 12 of the FSR type as proposed in document DE 4237072 for detecting whether or not the seat is occupied and disabling the airbag when this seat is empty. The sensor is in the form of a circuit printed on a flexible support which adapts to the deformations of the seat 10.

The reference 14 diagrammatically denotes a child seat installed on the passenger seat 10. Incorporated into this seat 14 is a support for a resonant circuit 16 which essentially consists of a flat coil which may, for example, be printed on an appropriate support together with a capacitor 20 (see FIG. 3) so as to form a resonant LC circuit. The child seat may also be equipped with a child seat occupancy sensor 12' constructed like the sensor 12.

Figure 2:
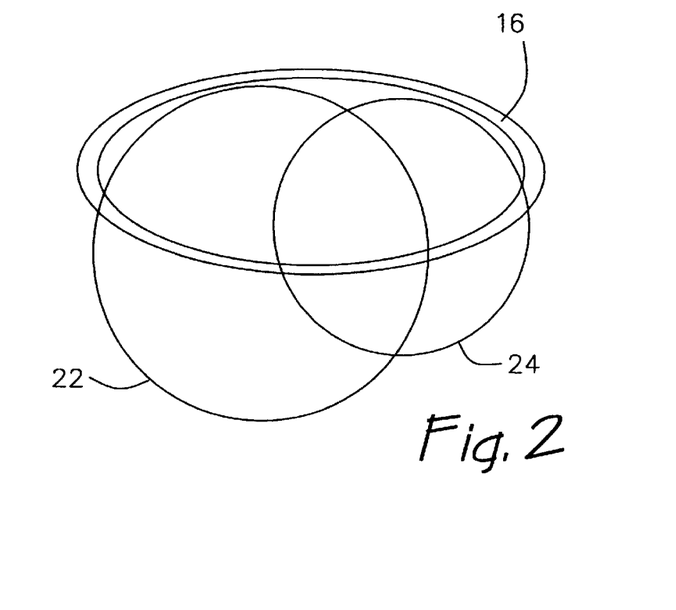
FIG. 2 is a schematic representation of the electromagnetic circuits.

On the sensor, in the passenger seat 10, there are two coils 22, 24 (see FIG. 2). These coils 22, 24 do not form part of a resonant circuit and may have a mediocre Q factor, which allows the use of coils produced by very economical means, for example silk-screen printed on the plastic support sheet of the sensor 12.

Figure 4:
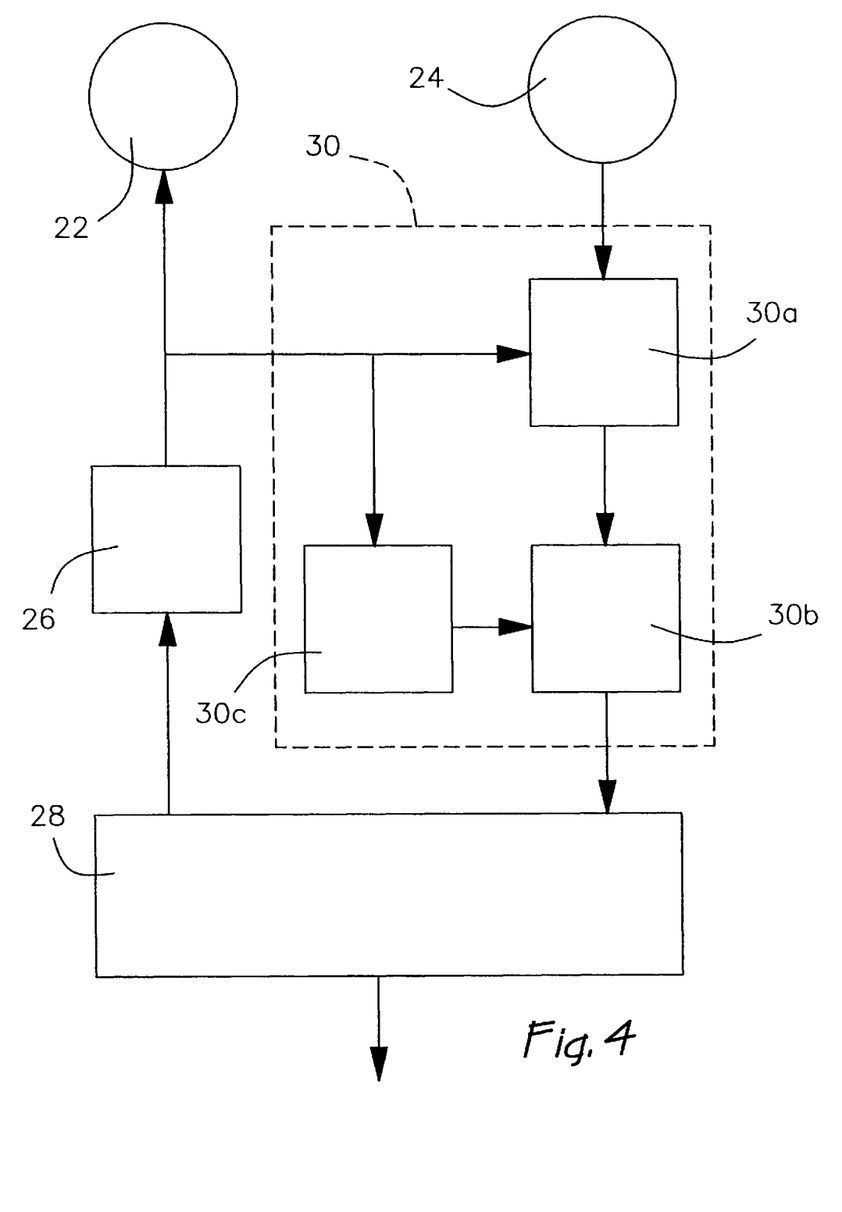
FIG. 4 is a block diagram of the circuits in the passenger seat.

One of the coils, for example the coil 22, is an emitter coil which, as FIG. 4 shows, is fed with alternating current by an oscillator 26 under the control of a microprocessor 28 which may be the standard microprocessor of the pressure sensor 12. The other coil 24, which is a receiver coil, is connected through an amplifying and demodulating circuit 30 to the microprocessor 28 which detects the state of excitation of the receiver coil 24.

If, installed on the seat 10, there is a child seat, in the base part of which is integrated a resonant circuit 16 according to the present invention, and if the coil of this resonant circuit at least partially covers each of the two coils 22 and 24, as represented in FIG. 2, the resonant circuit 16 is in a high state of excitation if the frequency of the oscillator 26 is close to the resonant frequency of the resonant circuit 16. The latter therefore in turn influences the electromagnetic coupling between the emitter coil 22 and the receiver coil 24. This modification in coupling is detected via the circuit 30 and the microprocessor 28 to trigger a signal bound for the airbag-control unit.

In other words, if, in standardized fashion, child seats include a resonant circuit 16 as described above and if this resonant circuit is always provided at a clearly determined location so that it is at least partially superimposed with the coils 22 and 24 in the passenger seat when the child seat faces the direction opposite to the direction of travel of the vehicle and if it is outside the influence of the two coils 22 and 24 when the seat points in the direction of travel of the vehicle, the airbag may be prevented from operating when the child seat faces backwards and may remain enabled when it faces forwards.

Figure 3:
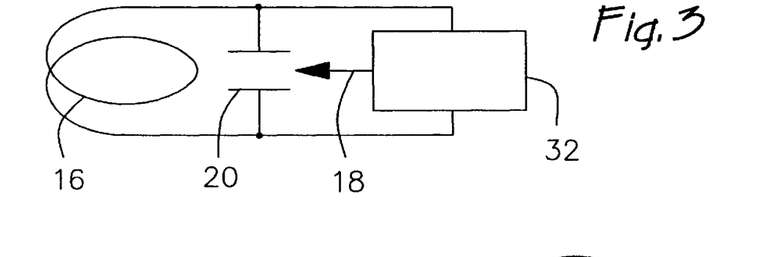
FIG. 3 represents an advantageous form of the resonant circuit in the child seat.

As FIG. 3 shows, each resonant circuit advantageously includes an electronic circuit 32 intended to modulate the electromagnetic coupling as symbolized by the arrow 18 so as to allow better identification of the resonant circuit and of the information to be transmitted. Such a circuit may consist of an integrated circuit operating without any supply of energy other than the voltage induced in the resonant circuit.

To improve the reliability of the interpretation of the results from the detection, the modulation of the electromagnetic coupling at the circuit 32 is advantageously achieved using a subcarrier frequency synchronous with the excitation generator. In this case, demodulation is synchronized with the excitation signal in the circuit 30 of FIG. 4 which in this case will include a synchronous demodulator 30a of the carrier frequency and a synchronous demodulator 30b of the subcarrier frequency as well as a divider 30c on the subcarrier frequency.

The circuit 32 may, as an option, include a system making it possible to preclude the possibility of the operation of the airbag being disabled when it shouldn't be, for example when a passenger is carrying an instrument or apparatus containing a coil capable of receiving excitation from the emitter 22. To guard against this eventuality, which is admittedly quite rare but theoretically possible, of a parasitic resonator being detected instead of the child seat, the circuit 32 serves to modulate the coupling of the resonant circuit 16 with a characteristic code or item of information, for example a binary sequence which is clearly defined and sufficiently long for the probability of picking up this sequence from a parasitic source, that is to say without the existence of this circuit, to be negligible.

In addition to the identification function, the binary sequence generated by the integrated circuit 32 may carry additional information, such as information on the type or model of child seat if the necessary bits are added to the basic codes.

Figure 5:
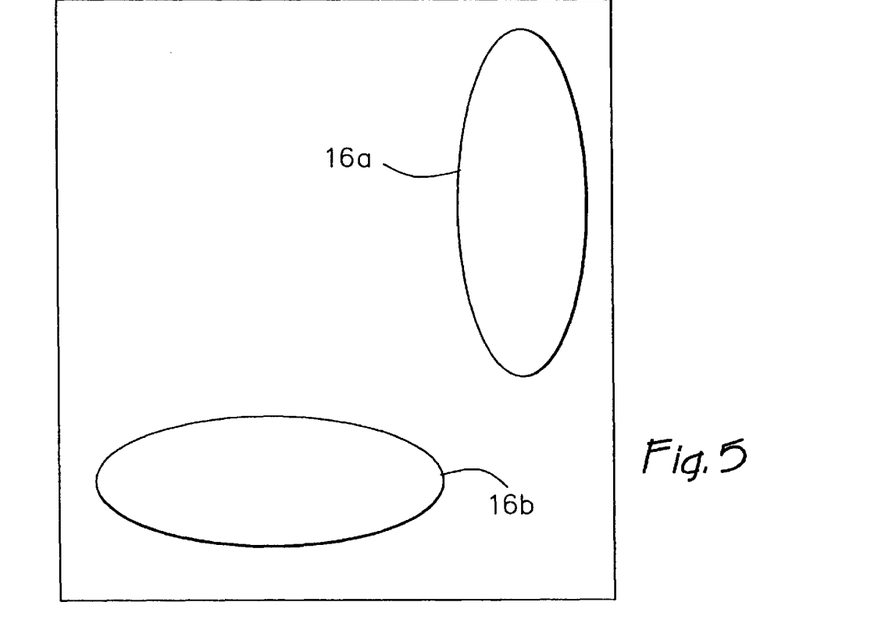
FIG. 5 is an advantageous alternative form of the resonant circuits of the child seat.

FIG. 5 diagrammatically illustrates an alternative form in which two resonant circuits 16A and 16B as described above are incorporated into the base part of the child seat. The circuits 32 associated with these resonant circuits 16A and 16B produce different modulations, for example using different subcarrier frequencies, which makes it possible automatically to recognize the orientation of the seat for disabling the airbag only when the seat is facing backwards. It is of course also possible to provide a system with more than two resonant circuits.

Given that the coils in the child seat and on the pressure sensor 12 can be made without substantial expenditure and that control may be provided by the standard microprocessor which is present in any case for the operation of the pressure sensor, the system proposed by the invention is very cheap.

Figure 6:
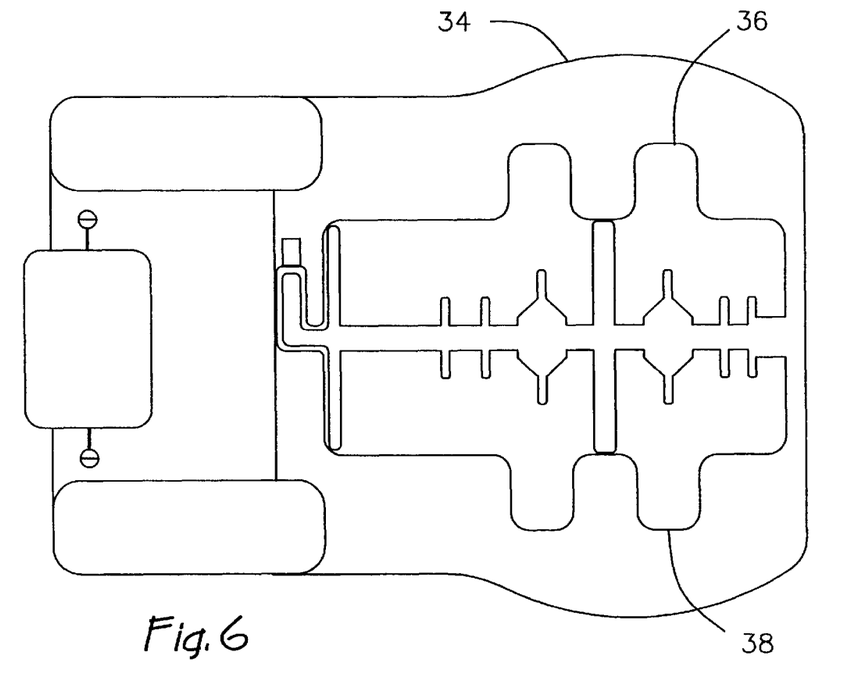
FIG. 6 shows a plan view of a passenger seat with an alternative form of an inductive circuit according to the present invention, FIG. 7 diagrammatically shows a horizontal section through the base of a child seat with a resonant circuit.

FIG. 6 shows a passenger seat 34 with an alternative form of inductive circuits according to the present invention. These circuits are preferably printed onto a flexible thin film which may be incorporated into the upper part of the seat 34 without putting the passenger to any discomfort.

These circuits consist of two elongate structures 36, 38 extending respectively along a lateral side of the seat. Each of the structures includes two inductive loops, one being an emitting antenna and the other a receiving antenna, it being possible for these loops to be superimposed, for example on either side of their support film. In the example represented, these loops have an irregular and complex outline, whose appearance may vary depending on the shape of the seat cushion in which they are incorporated. Although it is preferable to have both structures 36, 38, it should be noted that in principle just one of the structures 36 or 38 may suffice for detection.

Figure 7:
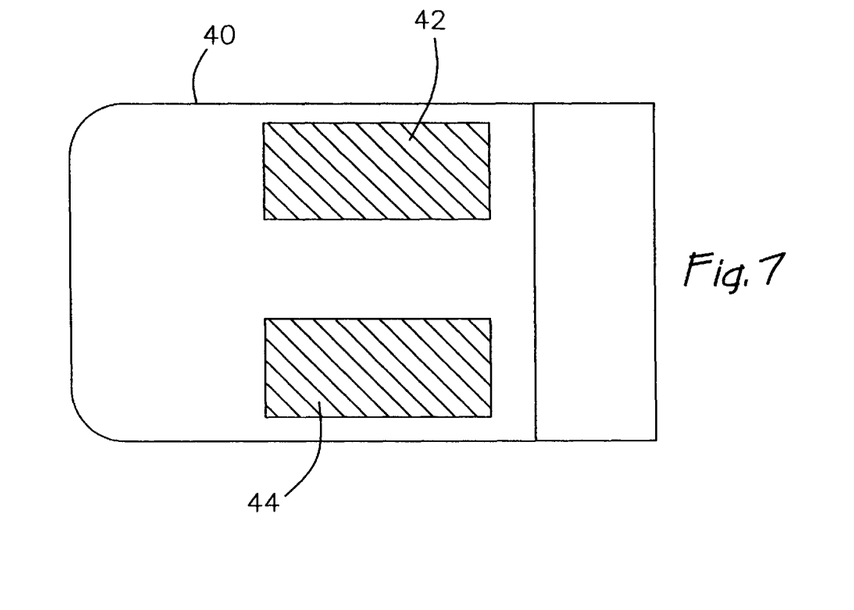

FIG. 7 shows a child seat 40 in the base of which there are resonant circuits on an appropriate support. These circuits include two resonant circuits 42, 44 consisting of large coils extending along the two lateral sides at the base of the seat 40.

Figure 8:
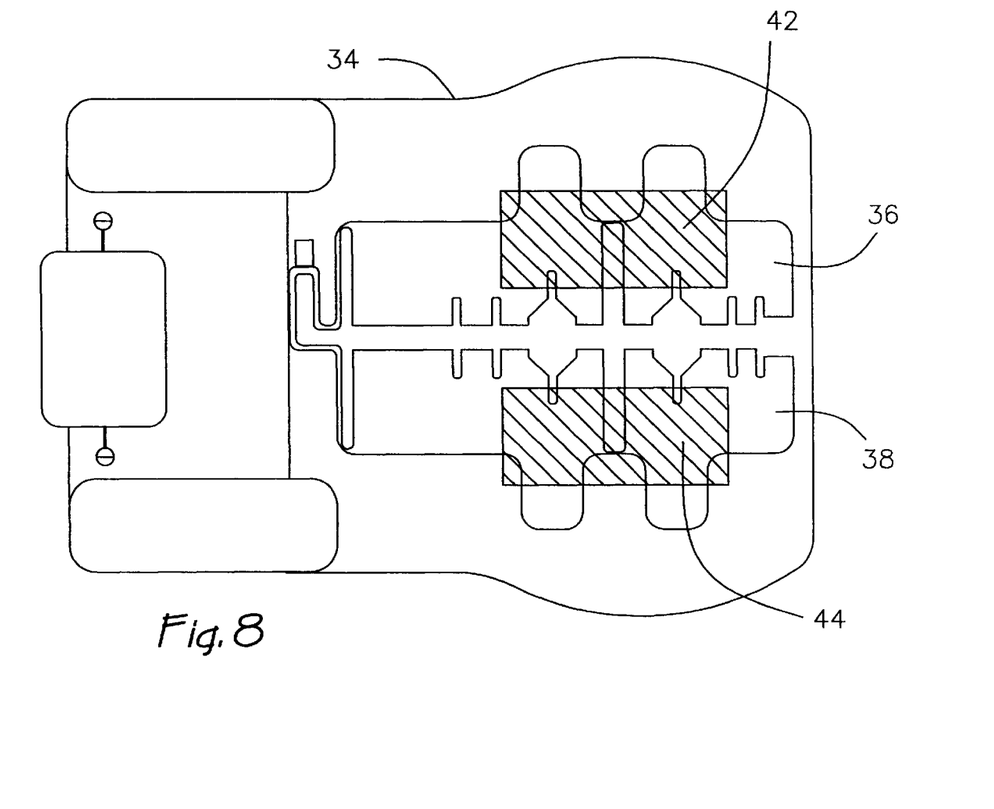
FIG. 8 is a diagrammatic superposition of the inductive and resonant circuits of FIGS. 6 and 7 when the child seat is placed on the passenger seat.

FIG. 8 diagrammatically shows the child seat 40 placed on the passenger seat 34. As can be gathered from FIG. 8, the resonant circuits 42 and 44 are always superimposed with the emitter and receiver antennae of the inductive structures 36, 38 in the passenger seat, even in the event of the child seat 40 sliding with respect to the passenger seat 34.

The inductive and resonant circuits of FIGS. 6–8 operate in the same way as those of the preceding figures and make it possible, as desired, to collect various information regarding the seat 40, especially information relating to the position and orientation the child seat 40 with respect to the passenger seat 34, the presence of the seat 40, optionally its type and the occupancy of the child seat 40.

Figure 9:
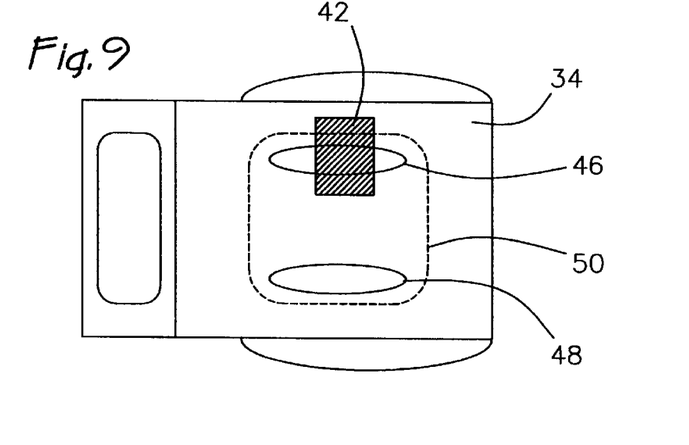
FIGS. 9 to 11 show different possible embodiments comprising only one resonant circuit in a diagrammatic superposition of the inductive and resonant circuits.
Figure 10:
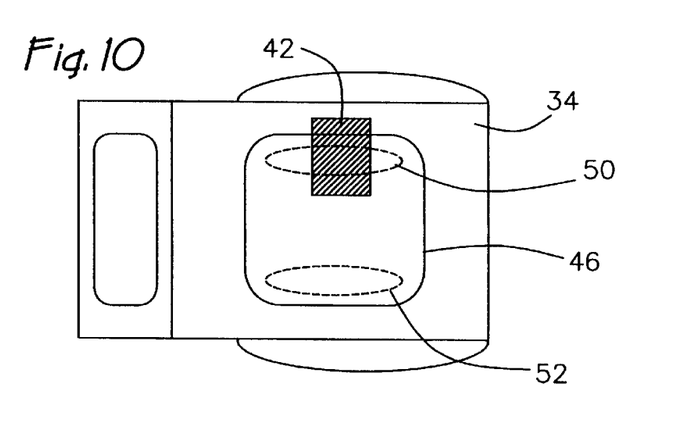
Figure 11:
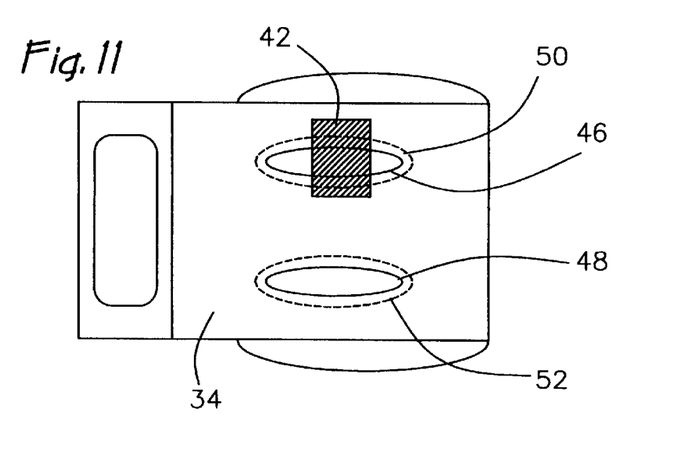

FIGS. 9 to 15 show different possible embodiments of the present invention in a diagrammatical superposition of the inductive and resonant circuits, whereby FIGS. 9 to 11 show embodiments with only one resonant circuit and FIGS. 12 to 15 show embodiments with two resonant circuits incorporated into the base of the child seat.

In a first of these embodiments (FIG. 9), two electromagnetic induction emitter coils 46 and 48 fed with alternating current of distinct frequencies and one electromagnetic induction receiver coil 50 are incorporated into the passenger seat 34. The receiver coil 50 is arranged in such a way that the receiving range of the receiver coil 50 overlaps the emitting range of each of the two emitter coils 46 and 48, each of which is extending along a lateral side of the seat 34. The resonant circuit is arranged along a lateral side of the base of the child seat. When the child seat is installed on the passenger seat 34, the coupling between one of the emitter/receiver pairs 46/50 or 48/50 is influenced by the resonant circuit 42 and the receiver coil 50 delivers a signal which is representative of the influenced pair (pair 46/50 in FIG. 9) and thus for the orientation of the child seat.

The embodiment of FIG. 10 comprises two receiver coils 50 and 52 and only one emitter coil 46. The receiver coils 50 and 52 extend along lateral sides of the seat 34 and the emitter coil is arranged in such a way that the emitting range of the emitter coil 46 overlaps the receiving range of each of the two receiver coils 50 and 52. By detecting the signals delivered by the two receiver coils 50 and 52, it is possible to distinguish the emitter/receiver pair 46/50 or 46/52 the electromagnetic coupling of which has been influenced by the presence of the resonant circuit 42.

The functioning of the embodiment of FIG. 11 is comparable to the one of the embodiment of FIG. 10, with the difference that each of the two receiver coils 50 and 52 is associated to a different emitter coil 46 and 48. By exciting the two emitter coils sequentially with alternating currents of different frequencies, this system offers further possibilities to distinguish the influenced emitter/receiver pair.

Figure 12:
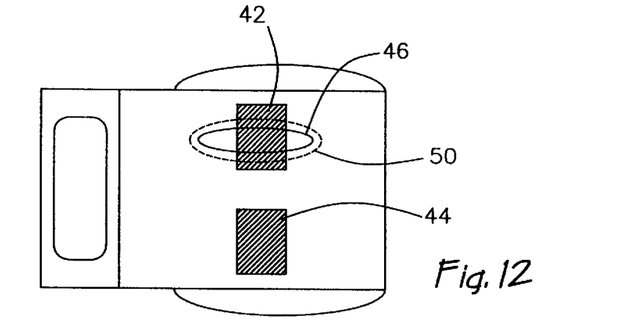
FIGS. 12 to 15 show different possible embodiments comprising two resonant circuits in a diagrammatic superposition of the inductive and resonant circuits.

In the embodiments of FIGS. 12 to 15, two resonant circuit circuits 42 and 44 are incorporated into the base of the child seat, the associated circuits of which produce different modulations of the coupling between respective emitter/receiver pairs. By analyzing the modulation of the signal delivered by the receiver coil 50, it is thus possible to distinguish between the two different orientations of the child seat on the passenger seat 34, even if the system comprises only one emitter 46 and one receiver 50, the respective emitting and receiving ranges of which overlap (as represented in FIG. 12).

Figure 13:
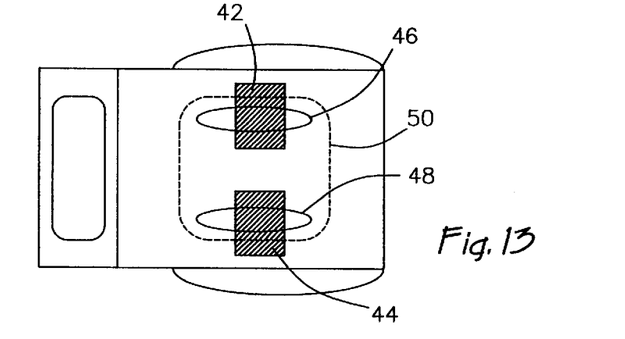
Figure 14:
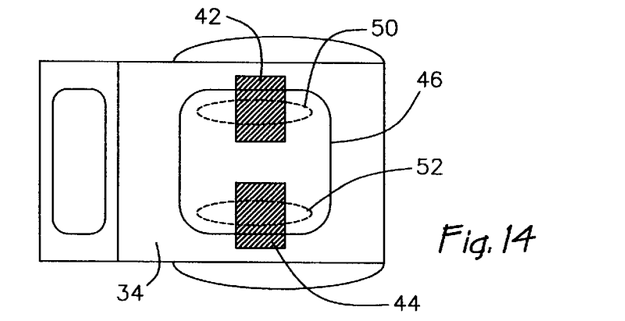
Figure 15:
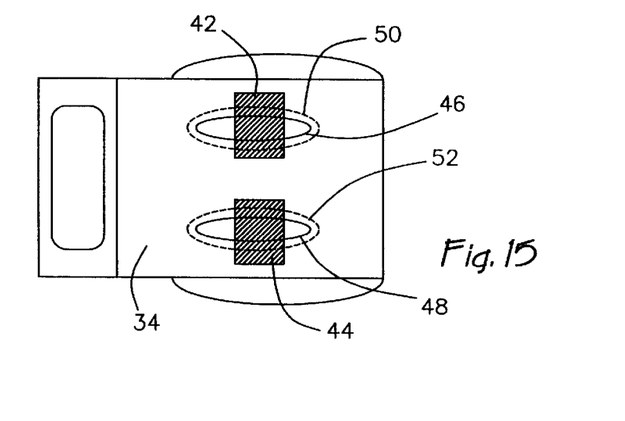

The systems represented in FIGS. 13 to 15 are comparable with those represented in FIGS. 9 to 11, with the difference of the second resonant circuit 44 incorporated into the child seat. It has to be noticed, that the additional component of these systems further increases the reliability of the detection of the presence and the orientation of a child seat. Furthermore, by analyzing the modulations of the signals delivered by the different receiving coils, it is possible to detect further parameters concerning the child seat, such as an off-center installation of the child seat on the passenger seat or a deviation of the longitudinal axis of the child seat from the longitudinal axis of the passenger seat. In fact, if the position of the child seat on the passenger seat differs from its desired position, the coupling of the e.g. emitter/receiver pair 46/50 is partly influenced by the resonant circuit 44 associated with the other emitter/receiver pair 48/52, whereby the influence is representative of the deviation from the desired position. By demodulating the respective receiver signal, this feedthrough of the different field modulations can than be detected and the respective parameter can be determined.

It will be noted, that due to the attenuation of the field intensities the receiver signal is also depending on the height at which the resonant circuit is positioned above the passenger seat. It follows that the detection system of the present invention offers the possibility to detect if the child seat is positioned directly on the passenger seat or if it is positioned above the seat, e.g. if the seat is installed on an object positioned on the seat.

Furthermore it should be clear, that by adding further components (emitter, receiver or resonant circuits) to the detection system it will be possible to detect even more parameters, such as e.g. the longitudinal position of the child seat on the passenger seat. By providing a further emitter/receiver pair for example, the feedthrough of the different electromagnetic fields allows to detect the longitudinal position of the child seat on the passenger seat.

After the detection, all the above mentioned parameters can be used to control the action of the airbag system associated with the passenger seat, e.g. by disabling the airbag when the different parameters indicate a dangerous installation of the child seat on the passenger seat or by adapting the speed and volume of the airbag deployment to the given installation. Furthermore these parameters can be used to warn the driver by a visual indicator in the dashboard of an installation of the child seat which does not conform to its specification.

Although the invention has been described, by way of illustration, with reference to the protection of an auxiliary seat installed on the front passenger seat of a vehicle, it is obvious that it is equally applicable to the rear passenger seats when these are protected by an airbag system.

Likewise, vehicles with several airbags equipped with several airbags or whose deployments are modulated by several explosive cartridges may derive great benefit from the information supplied by the present invention so as to adapt the deployment of the airbag or airbags to the specific circumstances.

What is claimed is:

1. A method for detecting certain parameters concerning an auxiliary child seat placed on a passenger seat of a motor vehicle equipped with an airbag protection system, said parameters being used to adapt the deployment of the airbag protection system associated with said passenger seat to specific circumstances determined by these parameters, said method using at least one electromagnetic induction emitter circuit and at least one electromagnetic induction receiver circuit, said at least one electromagnetic induction emitter circuit and said at least one electromagnetic induction receiver circuit being incorporated into the passenger seat of the vehicle which is protected by the airbag protection system, and at least one resonant circuit incorporated into a base of said child seat, provided that there are used at least two electromagnetic induction emitter circuits or at least two electromagnetic induction receiver circuits or at least two resonant circuits, said method comprising the steps of;

detecting presence of the child seat irrespective of orientation by detecting an influence on an electromagnetic coupling between said at least one electromagnetic induction emitter circuit and said at least one electromagnetic induction receiver circuit, said coupling being influenced by said at least one resonant circuit, and detecting orientation of the child seat when the child seat is present by analyzing the influence of said at least one resonant circuit on the electromagnetic coupling between said at least one electromagnetic induction emitter circuit and said at least one electromagnetic induction receiver circuit.

2. A method according to claim 1, wherein said at least one electromagnetic emitter circuit emits an excitation frequency, the excitation frequency being varied periodically within a band of predetermined frequencies.

3. A method according to claim 1, comprising the step of modulating the electromagnetic coupling between said at least one electromagnetic induction emitter circuit and said at least one electromagnetic induction receiver circuit with a characteristic modulation.

4. A method according to claim 3, comprising the step of analyzing the modulation of a signal of said at least one electromagnetic induction receiver circuit.

5. A method according to claim 3, wherein the modulation of the electromagnetic coupling is achieved by switching the resonant frequency of said at least one resonant circuit.

6. A method according to claim 3, wherein the modulation of the electromagnetic coupling is achieved with a subcarrier frequency synchronous with an excitation frequency of said at least one electromagnetic induction emitter circuit.

7. A method according to claim 3, comprising the step of using a demodulation circuit to demodulate a signal of said at least one electromagnetic induction receiver circuit.

8. A method according to claim 7, comprising the step of synchronizing the demodulation circuit with an excitation signal produced by said at least one electromagnetic induction emitter circuit, and comparing the excitation signal produced by said at least one electromagnetic induction emitter circuit for coincidence with a signal received by said at least one electromagnetic induction receiver circuit.

9. A method according to claim 3, comprising the step of modulating an inductive coupling of said at least one resonant circuit using a pseudo-random binary sequence imposed on said at least one resonant circuit.

10. A method according to claim 1, further comprising the step of detecting the lateral and/or longitudinal position of the child seat with respect to the passenger seat.

11. A method according to claim 1, further comprising the step of detecting the vertical position of the child seat with respect to the passenger seat.

12. A method according to claim 1, further comprising the step of detecting a deviation of the longitudinal axis of the child seat from the longitudinal axis of the passenger seat.

13. A system for detecting certain parameters concerning an auxiliary child seat placed on a passenger seat of a motor vehicle equipped with an airbag protection system, said parameters being used to adapt the deployment of the airbag protection system associated with said passenger seat to specific circumstances determined by these parameters, comprising:

at least one electromagnetic induction emitter circuit and at least one electromagnetic induction receiver circuit, said at least one electromagnetic induction emitter circuit and said at least one electromagnetic induction receiver circuit being incorporated into the passenger seat of the vehicle which is protected by the airbag protection system;

at least one resonant circuit incorporated into a base of said child seat and positioned, when the child seat is placed on the passenger seat, to influence an electromagnetic coupling between said at least one electromagnetic induction emitter circuit and said at least one electromagnetic induction receiver circuit so as to cause said at least one electromagnetic induction receiver circuit to deliver a signal representing at least one of the parameters;

wherein the system comprises at least two electromagnetic induction emitter circuits or at least two electromagnetic induction receiver circuits or at least two resonant circuits, the arrangement of said at least one electromagnetic induction emitter circuit and said at least one electromagnetic induction receiver circuit in the passenger seat and the arrangement of said at least one resonant circuit in the child seat being in such a way that;

presence of the child seat is detectable irrespective of orientation, and orientation of the child seat is detectable when the child seat is present.

14. A system according to claim 13, wherein said at least one resonant circuit incorporated into the child seat includes a flat coil associated with an electronic circuit intended to modulate the electromagnetic coupling with characteristic information.

15. A system according to claim 13, wherein said at least one resonant circuit incorporated into the child seat has a resonant frequency and includes means for switching the resonant frequency of said at least one resonant circuit, the switching of the resonant frequency thereby modulating the electromagnetic coupling.

16. A system according to claim 13, wherein said at least one electromagnetic induction emitter circuit includes at least one elongate inductive structure extending over a lateral side of the passenger seat, said at least one resonant circuit includes at least one inductive coil situated laterally in the base of the child seat, and said at least one elongate inductive structure in the passenger seat and said at least one inductive coil in the child seat are sized such that their superficial dimensions are greater than or comparable with the vertical distance between said at least one elongate inductive structure in the passenger seat and said at least one inductive coil in the child seat.

17. A system according to claim 16, wherein each lateral side of the passenger seat contains at least one inductive emitter structure.

18. A system according to claim 16, wherein each inductive emitter structure is formed on a flexible thin film incorporated into the seat.

19. A system according to claim 13, wherein said at least one electromagnetic induction receiver circuit includes at least one elongate inductive structure extending over a lateral side of the passenger seat, said at least one resonant circuit includes at least one inductive coil situated laterally in the base of the child seat, and said at least one elongate inductive structure in the passenger seat and said at least one inductive coil in the child seat are sized such that their superficial dimensions are greater than or comparable with the vertical distance between said at least one elongate inductive structure in the passenger seat and said at least one inductive coil in the child seat.

20. A system according to claim 19, wherein each lateral side of the passenger seat contains at least one inductive receiver structure.

21. A system according to claim 19, wherein each inductive receiver structure is formed on a flexible thin film incorporated into the seat.

22. A system according to claim 13, including at least two resonant circuits, each resonant circuit including at least one inductive coil situated laterally in the base of the child seat, wherein each lateral side of the child seat contains at least one inductive coil.

23. A system for detecting certain parameters concerning an auxiliary child seat placed on a passenger seat of a motor vehicle equipped with an airbag protection system, said parameters being used to adapt the deployment of the airbag protection system associated with said passenger seat to specific circumstances determined by these parameters, comprising:

at least one electromagnetic induction emitter circuit and at least one electromagnetic induction receiver circuit, wherein the system comprises at least two electromagnetic emitter circuits if only one receiver circuit is present and at least two receiver circuits if only one emitter circuit is present, said at least one electromagnetic induction emitter circuit and said at least one electromagnetic induction receiver circuit being incorporated into the passenger seat of the vehicle which is protected by the airbag protection system; and at least one resonant circuit incorporated into a base of said child seat and positioned, when the child seat is placed on the passenger seat, to influence an electromagnetic coupling between said at least one electromagnetic induction emitter circuit and said at least one electromagnetic induction receiver circuit so as to cause said at least one electromagnetic induction receiver circuit to deliver a signal providing means for determining the location of the resonant circuit with respect to said at least one electromagnetic induction emitter circuit and said at least one electromagnetic induction receiver circuit.

24. A system according to claim 23, comprising two electromagnetic induction emitter circuits and one electromagnetic induction receiver circuit, said electromagnetic induction receiver circuit being arranged so that coupling between each of the two electromagnetic induction emitter circuits and said electromagnetic induction receiver circuit occurs.

25. A system according to claim 23, comprising one electromagnetic induction emitter circuit and two electromagnetic induction receiver circuits, said electromagnetic induction emitter circuit being arranged so that coupling between said electromagnetic induction emitter circuit and each of the two electromagnetic induction receiver circuits occurs.

26. A system according to claim 23, wherein said at least one resonant circuit is associated with electronic modulation circuit means for modulating the electromagnetic coupling between said at least one electromagnetic induction emitter circuit and said at least one electromagnetic induction receiver circuit with a characteristic modulation.

27. A system according to claim 26, wherein the means for modulating the electromagnetic coupling comprises means for switching of a resonant frequency of said at least one resonant circuit.

28. A system according to claim 27, wherein the modulation of the electromagnetic coupling is achieved with a subcarrier frequency synchronous with an excitation generator.

29. A system according to claim 28, wherein the electronic modulation circuit means comprises at least one frequency divider for providing of a synchronous subcarrier frequency.

30. A system according to claim 28, wherein means is provided for modulating an inductive coupling by said at least one resonant circuit using a pseudo-random binary sequence imposed on said at least one resonant circuit.

31. A system according to claim 26 comprising at least two resonant circuits, wherein distinct resonant circuits comprise means for modulating the electromagnetic coupling with a distinct modulation, the distinct modulation of each resonant circuit providing means for distinguishing between the respective resonant circuits.

32. A system according to claim 31, wherein the modulation of the electromagnetic coupling by each of the resonant circuits is achieved with a subcarrier frequency synchronous with an excitation generator and wherein the subcarrier frequencies of each of the resonant circuits are different.

33. A system according to claim 23, wherein said at least one electromagnetic induction emitter circuit incorporates an oscillator operating at a given frequency.

34. A system according to claim 33, wherein said at least one electromagnetic induction receiver circuit incorporates a demodulation circuit.

35. A system according to claim 34, including means for synchronizing the demodulation circuit with an excitation signal produced by the oscillator, and wherein the excitation signal produced by the oscillator is compared for coincidence with a signal received by said at least one electromagnetic induction receiver circuit.

36. A system according to claim 23, wherein said at least one electromagnetic emitter circuit emits an excitation frequency and means is provided for periodically varying the excitation frequency within a band of predetermined frequencies.

37. A system for detecting certain parameters concerning an auxiliary child seat placed on a passenger seat of a motor vehicle equipped with an airbag protection system so that the parameters are used to adapt the deployment of the airbag protection system associated with the seat supporting said auxiliary seat according to the parameters detected, comprising:

at least one electromagnetic induction emitter circuit and at least one electromagnetic induction receiver circuit, said at least one electromagnetic induction emitter circuit and said at least one electromagnetic induction receiver circuit being incorporated into the passenger seat of the vehicle which is protected by the airbag protection system;

at least two resonant circuits incorporated into a base of the child seat and positioned, when the child seat is placed on the passenger seat, to influence an electromagnetic coupling between said at least one electromagnetic induction emitter circuit and said at least one electromagnetic induction receiver circuit so as to cause said at least one electromagnetic induction receiver circuit to deliver a signal representing at least one of the parameters;

wherein each resonant circuit is associated with electronic modulation circuit means for modulating the electromagnetic coupling with a distinct modulation, the distinct modulation of each resonant circuit providing means for distinguishing between the respective resonant circuits, said at least one electromagnetic induction emitter circuit incorporating an oscillator operating at a given frequency and each resonant circuit in the child seat modulating the resonant frequency with a subcarrier frequency synchronous with the oscillator.

38. A system according to claim 31, wherein the means for modulating the electromagnetic coupling comprises at least one frequency divider providing a synchronous subcarrier frequency.

39. A system according to claim 38, wherein each resonant circuit has a distinct subcarrier frequency.

40. A system according to claim 37, wherein said at least one electromagnetic induction receiver circuit incorporates a demodulation circuit.

41. A system according to claim 40, including means for synchronizing said demodulation circuit with an excitation signal produced by said oscillator, and wherein the excitation signal produced by said oscillator is compared for coincidence with a signal received by said at least one electromagnetic induction receiver circuit.

42. A system for detecting certain parameters concerning an auxiliary child seat placed on a passenger seat of a motor vehicle equipped with an airbag protection system so that the parameters are used to adapt the deployment of the airbag protection system associated with the seat supporting said auxiliary seat according to the parameters detected, comprising:

at least one electromagnetic induction emitter circuit and at least one electromagnetic induction receiver circuit, said at least one electromagnetic induction emitter circuit and said at least one electromagnetic induction receiver circuit being incorporated into the passenger seat of the vehicle which is protected by the airbag protection system;

at least two resonant circuits incorporated into a base of the child seat and positioned, when the child seat is placed on the passenger seat, to influence an electromagnetic coupling between said at least one electromagnetic induction emitter circuit and said at least one electromagnetic induction receiver circuit so as to cause said at least one electromagnetic induction receiver circuit to deliver a signal representing at least one of the parameters;

wherein each resonant circuit is associated with electronic modulation circuit means for modulating the electromagnetic coupling with a distinct modulation, the distinct modulation of each resonant circuit providing means for distinguishing between the respective resonant circuits, and means is provided for modulating an inductive coupling of the resonant circuits using a pseudo-random binary sequence imposed on the resonant circuits.

43. An auxiliary child seat for installing on a passenger seat of a motor vehicle, the passenger seat having at least one electromagnetic induction emitter circuit and at least one electromagnetic induction receiver circuit, the child seat comprising at least two resonant circuits incorporated therein and arranged for cooperating with said at least one electromagnetic induction emitter circuit and said at least one electromagnetic induction receiver circuit in order to determine certain parameters concerning said auxiliary child seat.

44. An auxiliary child seat according to claim 43, wherein an electromagnetic coupling exists between said at least one electromagnetic induction emitter circuit and said at least one electromagnetic induction receiver circuit, said at least two resonant circuits comprising means adapted for influencing the electromagnetic coupling between said at least one electromagnetic induction emitter circuit and said at least one electromagnetic induction receiver circuit so as to cause said at least one electromagnetic induction receiver circuit to deliver a signal representing at least one of the parameters.

45. An auxiliary child seat according to claim 44, wherein each resonant circuit is associated with electronic modulation circuit means adapted for modulating the electromagnetic coupling with a distinct modulation, the distinct modulation of each resonant circuit providing means for distinguishing between the respective resonant circuits.

46. An auxiliary child seat according to claim 45, wherein each resonant circuit has a resonant frequency and includes means for switching the resonant frequency of each resonant circuit, the switching of the resonant frequency thereby adapted for modulating the electromagnetic coupling.

47. An auxiliary child seat according to claim 46, wherein said at least one electromagnetic induction emitter circuit in the passenger seat of the vehicle has an exciting frequency, each resonant circuit in the child seat modulating the resonant frequency with a subcarrier frequency adapted to be synchronous with the exciting frequency.

48. An auxiliary child seat according to claim 47, wherein the electronic modulation circuit means comprises at least one frequency divider for providing of a synchronous subcarrier frequency.

49. An auxiliary child seat according to claim 48, wherein each resonant circuit has a distinct subcarrier frequency.

50. An auxiliary child seat according to claim 45, wherein means is provided for modulating an inductive coupling of the resonant circuits using a pseudo-random binary sequence imposed on the resonant circuits.

51. An auxiliary child seat according to claim 44, wherein each resonant circuit comprises a flat coil associated with an electronic circuit adapted for modulating the electromagnetic coupling with characteristic information.

52. A resonant circuit adapted for installation in an auxiliary child seat installed on a passenger seat of a vehicle, the passenger seat having at least one electromagnetic induction emitter circuit and at least one electromagnetic induction receiver circuit, the passenger seat having at least two emitter circuits if only one receiver circuit is present and at least two receiver circuits if only one emitter circuit is present, the resonant circuit comprising means adapted for influencing an electromagnetic coupling between said at least one electromagnetic induction emitter circuit and said at least one electromagnetic induction receiver circuit.

53. A resonant circuit according to claim 52 wherein the electromagnetic coupling exists between said at least one electromagnetic induction emitter circuit and said at least one electromagnetic induction receiver circuit in the passenger seat, said resonant circuit being associated with electronic modulation circuit means adapted for modulating the electromagnetic coupling with a characteristic modulation.

54. A resonant circuit according to claim 53, comprising a flat coil associated with an electronic circuit adapted for modulating the electromagnetic coupling with characteristic information.

55. A resonant circuit according to claim 53, having a resonant frequency and comprising means for switching said resonant frequency, the switching of the resonant frequency thereby adapted for modulating the electromagnetic coupling.

56. A resonant circuit according to claim 55, wherein said at least one electromagnetic induction emitter circuit of the passenger seat has an exciting frequency, the resonant circuit modulating the resonant frequency with a subcarrier frequency adapted to be synchronous with the exciting frequency.

57. A resonant circuit according to claim 56, wherein the electronic modulation circuit means comprises at least one frequency divider for providing of a synchronous subcarrier frequency.

58. A resonant circuit according to claim 55, wherein means is provided for modulating an inductive coupling of the resonant circuit using a pseudo-random binary sequence imposed on the resonant circuit.

59. A pair of resonant circuits for incorporating in an auxiliary child seat for installing on a passenger seat of a motor vehicle, the passenger seat having at least one electromagnetic induction emitter circuit and at least one electromagnetic induction receiver circuit, an electromagnetic coupling existing between said at least one electromagnetic induction emitter circuit and said at least one electromagnetic induction receiver circuit, said pair of resonant circuits adapted for influencing the electromagnetic coupling between said at least one electromagnetic induction emitter circuit and said at least one electromagnetic induction receiver circuit, wherein the resonant circuits of said pair of resonant circuits have different resonant frequencies.

60. A pair of resonant circuits according to claim each resonant circuit being associated with electronic modulation circuit means adapted for modulating the electromagnetic coupling with a characteristic modulation, the different resonant circuits of said pair of resonant circuits providing for different characteristic modulations.

61. A pair of resonant circuits according to claim 59, each resonant circuit comprising means for switching the respective resonant frequency, the switching of the respective resonant frequency thereby adapted for modulating the electromagnetic coupling.

62. A pair of resonant circuits according to claim 59 in which said at least one electromagnetic induction emitter circuit in the passenger seat has an exciting frequency, each of said resonant circuits modulating the respective resonant frequency with a subcarrier frequency adapted to be synchronous with the exciting frequency.

63. A pair of resonant circuits according to claim 62, wherein the different resonant circuits of said pair of resonant circuits modulate the respective resonant frequency with a different subcarrier frequency.

* * * * *